H. LEMP.
CONTROLLING MEANS FOR ENGINE GENERATOR DRIVEN VEHICLES.
APPLICATION FILED DEC. 17, 1918.
1,313,097.
Patented Aug. 12, 1919.
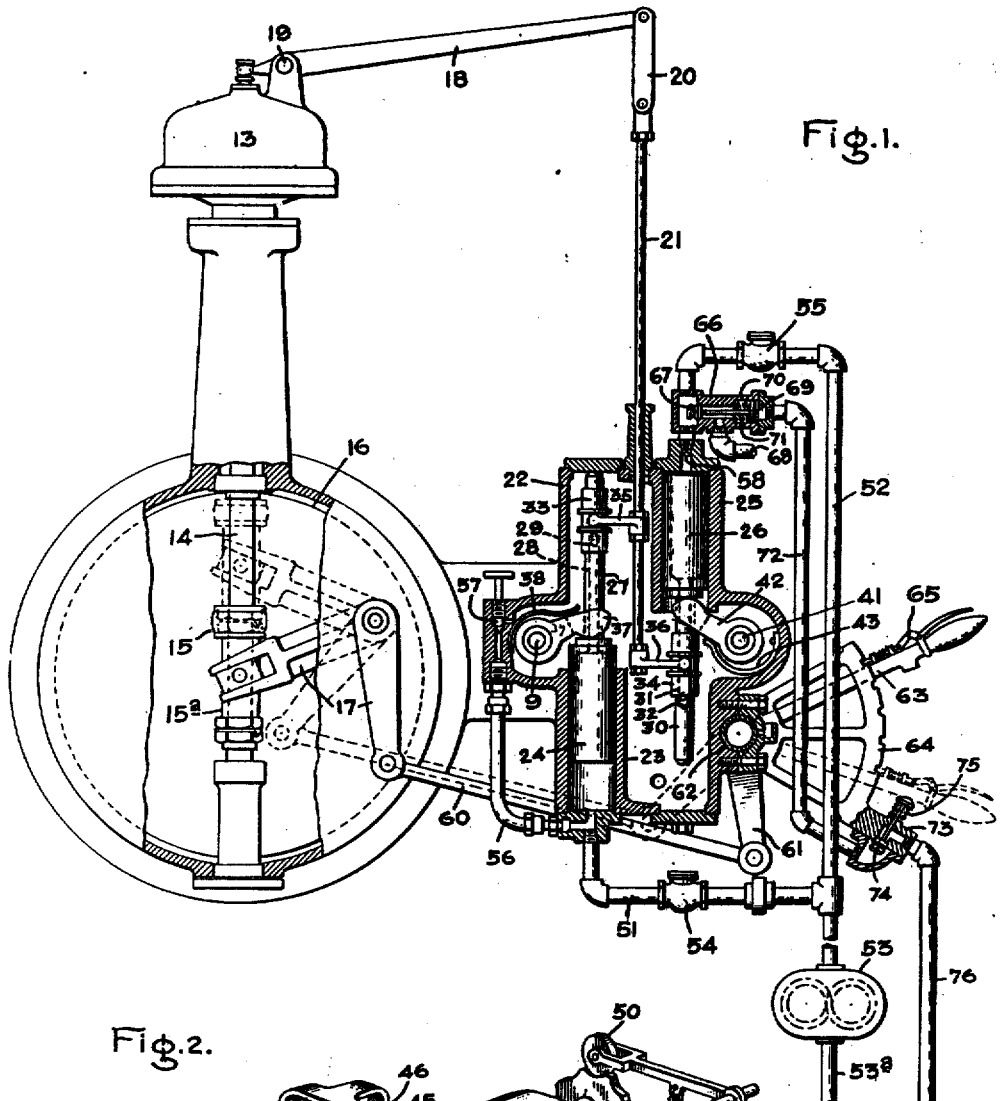
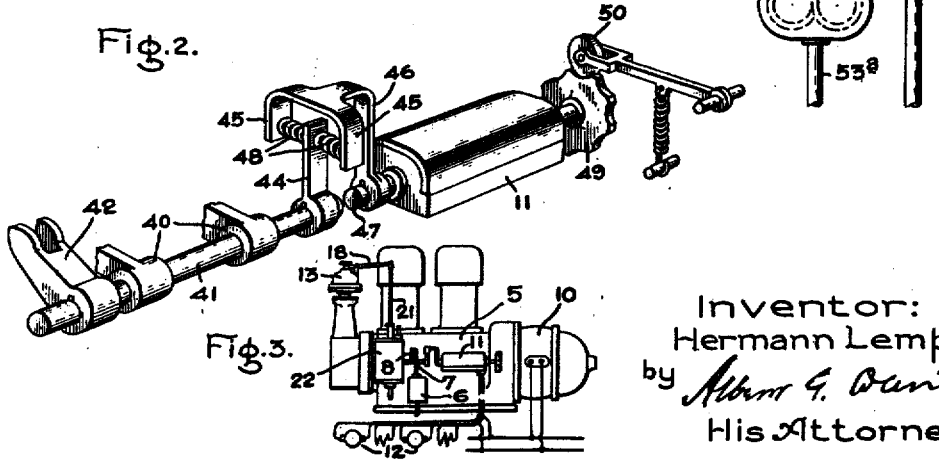
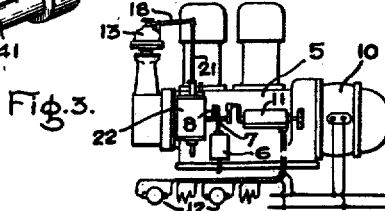
Inventor:
Hermann Lemp,
by Albert G. Davis
His Attorney.

UNITED STATES PATENT OFFICE.

HERMANN LEMP, OF ERIE, PENNSYLVANIA, ASSIGNOR TO GENERAL ELECTRIC COMPANY, A CORPORATION OF NEW YORK.

CONTROLLING MEANS FOR ENGINE-GENERATOR-DRIVEN VEHICLES.

1,313,097. Specification of Letters Patent. Patented Aug. 12, 1919.

Application filed December 17, 1918. Serial No. 267,117.

*To all whom it may concern:*

Be it known that I, HERMANN LEMP, a citizen of the United States, residing at Erie, in the county of Erie, State of Pennsylvania, have invented certain new and useful Improvements in Controlling Means for Engine-Generator-Driven Vehicles, of which the following is a specification.

The present invention relates to self-propelled vehicles in which an internal combustion engine is arranged to drive an electric generator which in turn supplies current to one or more motors for driving the vehicle, such motors being commonly mounted on the trucks. The speed of the vehicle is controlled by varying the strength of the field of the generator, and by connecting the motors in series or parallel and varying the resistance in series therewith. The engine speed is controlled by varying the admission of fuel thereto. Changes in the strength of the generator field and changes in the motor circuits are obtained by a drum controller. Assuming that it be desired to propel the vehicle at say 40 miles per hour, it can be accomplished by moving the fuel control lever to one position and the controller handle to another position. These positions of the fuel control lever and controller handle produce, as a net result, the desired speed of the vehicle. This may mean for example that the engine is running very rapidly; that a certain amount of resistance has been cut out of the field circuit of the generator and that the motors are connected in parallel with or without resistance as the case may be. This same vehicle speed could, however, be produced by adjusting the throttle lever to a position admitting less fuel to the engine, thereby reducing its speed and adjusting the controller handle to a position where a different amount of resistance is included in the field circuit of the generator or a different relation of the motor circuits is produced, or both. To state the matter in another way, the same vehicle speed may be obtained by different settings of the controlling devices, one of which is more economical of fuel than the other. From this it follows that the economical or non-economical operation of the vehicle is left almost, if not entirely, to the operator whose judgment may or may not be good.

An analogy is found in the automobile art. The operator may utilize the high speed gear, and throttle the supply of gasolene to the engine running the same below normal speed to give the desired speed of the vehicle; or he may utilize the intermediate or other gear and run the engine faster on throttle to obtain the same vehicle speed. For a given condition one arrangement is more economical than the other. Comparatively few operators, however, are able to drive a car under the most economical conditions all the time.

The object of my invention is to provide an improved arrangement wherein the engine speed and the circuit connections are automatically and progressively controlled to give the best conditions of operation for each and all speeds of the vehicle and particularly to obtain an economical acceleration. A further object is to provide an arrangement wherein the parts are so associated and combined that a single operating handle suffices to control the setting of all of them.

For a consideration of what I believe to be novel and my invention, attention is directed to the accompanying description and the claims appended thereto.

In the drawing, Figure 1 is a view partly in section of a mechanism embodying my invention; Fig. 2 is a perspective view of certain parts, and Fig. 3 is an outline of an engine driven generator with a system embodying my invention illustrated diagrammatically in connection therewith.

Referring to the drawing, Fig. 3, 5 indicates an internal combustion engine which may be of any suitable type and operated by any suitable fuel. In the present instance an engine operated by fuel oil is shown, and 6 indicates a pump for supplying such fuel oil. The pump may be operated from the crank shaft of the engine as is well understood. The speed of such an engine is regulated by varying the amount of fuel delivered by the pump and this is accomplished in the pump shown by moving the rod 7 up and down. Rod 7 is connected to an arm 8 on the end of a shaft 9 (Fig. 1) and as this shaft is turned, as explained hereinafter, rod 7 is moved to vary the output of the pump 6. The specific structure of pump 6 and the arrangement for varying the amount of fuel delivered thereby form no part of the present invention and the same are accordingly not illustrated or described.

Such pumps are well known and it will be understood that any suitable arrangement may be used.

Direct connected to engine 5 is a generator 10 which is electrically connected through a controller 11 to motors 12 which as is well understood drive the car axles. The controller 11 may control only the field resistance or resistances or it may control both the field resistance or resistances and the series parallel connections of the motors. 13 indicates a speed governor for the engine which governor may be of any suitable type.

Referring now particularly to Fig. 1, the speed governor 13 has a spindle 14 on which is splined a friction wheel 15 with its edge in engagement with the face of a friction disk 16 driven from the crank shaft of engine 5. Surrounding spindle 14 below friction wheel 15 is a sleeve 15ª in which the spindle turns and on which friction wheel 15 is rotatably mounted, and connected to sleeve 15ª is a bell crank lever 17 by means of which the wheel 15 may be moved radially over the face of disk 16 toward and away from its center. As is clear, this arrangement constitutes a change speed drive between the engine and the governor. By moving the friction wheel 15 relative to disk 16 it is possible while maintaining the governor at approximately its most effective range of speed, to control the engine over the latter's entire range of speed.

Connected to the upper end of governor spindle 14 is one end of a lever 18 pivoted at 19 and having its other end connected by a link 20 to a rod 21 which projects into a control casing 22. In casing 22 is a cylinder 23 having a piston 24 therein, and a cylinder 25 having a piston 26 therein. Piston 24 is hollow and has connected to it a stem 27 which has a longitudinally extending passage 28 therein communicating with the inside of piston 24. Passage 28 terminates short of the outer end of stem 27 and in stem 27 adjacent the outer end of passage 28 is a transverse hole 29. Likewise piston 26 is hollow and has a stem 30 provided with a longitudinally extending passage 31 communicating at its inner end with the inside of piston 26 and at its outer end with a transverse hole 32 in stem 30. Arranged to slide on stems 27 and 30 are sleeves 33 and 34 respectively, which sleeves serve to cover and uncover holes 29 and 32. Sleeves 33 and 34 are connected by arms 35 and 36 to rod 21, the arms being fixed to rod 21 and having furcations which engage between collars on the sleeves. By this arrangement it will be seen that the speed governor as it moves through its range moves sleeves 33 and 34 longitudinally on stems 27 and 30. The shaft 9 which has been previously referred to as controlling the admission of fuel to the engine has fixed thereon an arm 37 having a bifurcated end, the forks of which straddle stem 27 and rest on top of the piston 24. Engaging arm 37 is a spring 38 which acts to force piston 24 toward the bottom of cylinder 23. The arrangement is such that when arm 37 is turned in an anti-clockwise direction by an upward movement of piston 24 the amount of fuel admitted to engine 5 is increased while when arm 37 moves in the opposite direction by spring 38 the amount of fuel admitted to the engine is decreased. The spring 38 thus constitutes a means which biases the control mechanism for fuel pump 6 toward "off" position. It will be understood that the showing of spring 38 is only diagrammatic and that in actual practice a suitable arrangement of long range nearly constant torque type of spring would be utilized.

Carried in suitable journals 40 (Fig. 2) is a shaft 41, one end of which projects into casing 22 and has fixed to it an arm 42 having a bifurcated end, the forks of which straddle stem 30 and rest on the end of piston 26. Engaging arm 42 is a spring 43 which acts to force piston 26 toward the bottom of cylinder 25. Shaft 41 moves the controller 11 and as shown in Fig. 2, the shaft is provided with an arm 44 which projects between two spaced ears 45 carried by an arm 46 fixed to controller drum shaft 47. Between arm 44 and ears 45 are springs 48 through which motion is imparted from arm 44 to arm 46. On controller drum shaft 47 is a star wheel 49 on which rides a spring pressed roller 50. The purpose of the arrangement just described is to give a step by step movement to the controller and any suitable arrangement for this purpose may be utilized. With the arrangement shown, as shaft 41 turns it puts one or the other of the springs 48 under compression and when the power thus stored in the spring becomes sufficient the controller will be quickly turned one notch as determined by star wheel 49.

Referring now to Fig. 1, the arrangement is such that when arm 42 moves in an anti-clockwise direction, i. e., when piston 26 moves downward, the controller 11 is moved toward "on" position, that is, it is moved to strengthen the generator field or to vary the motor connections or both in proper sequence as is well understood, while when it is moved by spring 43 in the opposite direction controller 11 is moved toward first or starting position. Spring 43 thus constitutes a means which biases the controller 11 toward first or starting position.

Connected to cylinder 23 and 25 are pressure pipes 51 and 52 respectively, which lead to a gear pump 53 which is operated by the engine and has a suction or inlet pipe 53ª. In pipes 51 and 52 are suitable non-return check valves 54 and 55. The gear pump 53 delivers oil or other suitable liquid under pressure to both cylinders 23 and 25 and under certain conditions the pressure may move pistons 24 and 26 to positions where the ends of stems 27 and 30 strike casing 22 which serves as a stop to limit the movements. To prevent undue pressure occurring in cylinders 23 and 25 suitable by-passes of limited area are arranged. In connection with cylinder 23 a by-pass pipe 56 having a regulating valve 57 therein is shown. A similar arrangement is used in connection with cylinder 25 but only the by-pass opening 58 shows in the drawing. The arrangement will be readily understood, however, from that shown in connection with cylinder 23.

Connected to bell crank lever 17 is one end of a rod 60 the other end of which is connected to an arm 61 fixed on a shaft 62. Also fixed to shaft 62 is an operating handle 63 which moves over a notched segment 64 and has a suitable latch 65 for locking the handle in adjusted position. By means of handle 63 friction wheel 15 is moved across the face of disk 16. Connected with pressure pipe 52 is a casing 66 in which is a valve 67. When valve 67 is open any pressure in pipe 52 or in cylinder 25 is quickly released through a waste pipe 68 which may lead to the suction side of the gear pump. The stem of valve 67 is connected to a piston 69 which moves in a cylinder 70 and a spring 71 is provided which tends to hold valve 67 closed. Connected to the end of cylinder 70 is a pipe 72 which leads to a valve casing 73 adjacent segment 64. In valve casing 73 is a valve 74 normally held closed by a spring 75 but which is opened whenever operating handle 63 is in or is moved to the dotted line position which is the starting or low speed position, the arrangement being such that when handle 63 is moved to such position, it strikes the end of the stem of valve 74 and pushes valve 74 open against the action of spring 75. Connected to valve casing 73 on the side of it opposite to that on which pipe 72 connects is a pipe 76 which may lead from any suitable source of fluid pressure. When operating handle 63 is in the dotted line position, valve 74 is opened which permits fluid pressure to pass through pipe 72 to cylinder 70 thus opening valve 67 which, as already stated, relieves any pressure which may exist in cylinder 25 and prevents any pressure from being built up therein. It will thus be seen that as long as operating handle 63 is in the dotted line position the controller will always remain in the first position and that if handle 63 is moved from a forward position to the dotted line position at a time when the controller is not in the first position, the controller will immediately move to such position.

Considering now the operation of the mechanism and referring particularly to Fig. 1, assume that the car is running and that the control handle 63 is in the full line position. The gear pump 53 will be operating and supplying fluid under pressure to cylinders 23 and 25. With the control handle 63 in the full line position friction wheel 15 will be located quite close to the center of disk 16. This is the highest speed and highest engine power position and means that the engine speed approaches most nearly to that of the normal speed of the governor. In the case of cylinder 23, sleeve 33 covers hole 29 in stem 27 so that the pressure supplied to cylinder 23 by pump 53 cannot escape through hole 29. As a result the pressure in cylinder 23 has built up and moved piston 24 to a position where the end of stem 27 is against casing 22. This in turn has moved arm 37 on shaft 9 against the action of spring 38 to a position which gives full fuel admission to the engine. In the case of cylinder 25, sleeve 34 covers but a small part of hole 32. As a result the pressure supplied from gear pump 53 to cylinder 25 escapes through hole 32 with the result that no pressure or at least insufficient pressure has built up back of piston 26 to effect the movement of piston 26, and hence of arm 42 and shaft 41, which movement operates the controller 11. The valves 67 and 74 are both closed.

If now with the parts in the positions described, the speed of the engine 5 increases beyond normal then governor 13 will operate to raise the left hand end of lever 18 and lower the right hand end. The effect of this will be to move both sleeves 33 and 34 downward. In the case of sleeve 33, it moves the upper edge of the sleeve toward hole 29 but this does not affect the position of piston 24 and cylinder 23 because hole 29 will still be covered by sleeve 33. In the case of sleeve 34 the effect is to cause the lower edge of the sleeve to move farther over hole 32 and to cover the same entirely if the movement of the governor is sufficient. As a result less fluid or no fluid at all escapes through hole 32 so that pressure begins to build up in cylinder 25 back of the piston 26. This pressure will move piston 25 downward and upon sufficient movement the controller 11 will be moved one notch as is obvious. The movement of the controller throws a greater load on the engine with the result that the engine speed will decrease. With decrease in engine speed, governor 13 will move sleeve 34 upward which moves the lower edge of the sleeve in a direction to uncover hole 32. At the same time, the downward movement of piston 26 moves stem 30 in a direction to bring hole 32 from under sleeve 34. The result of these movements is that hole 32 will be uncovered to a greater or lesser extent to permit fluid pressure to escape from behind piston 26 and a balance will be reached between the fluid supplied to cylinder 25 and that escaping through hole 32 which will maintain a certain constant pressure in cylinder 25. If moving the controller one notch has not been sufficient to lower the engine speed, the operation just described will be repeated with the result that the controller will be moved another notch. This may continue until the controller is in the last position which would be the position of maximum generator field strength and parallel connection for the motors. It will be noted that during the movements of the piston 26 just described wherein the controller has moved from the first to the last position, piston 24 has not moved (although its controlling sleeve 33 has moved downward with controller sleeve 34) but has remained in a position to give maximum fuel admission to the engine 5.

If when the controller reaches the last position which means that the end of stem 30 strikes the bottom of casing 22, the engine speed still remains high then the governor will move lever 18 still farther with the result that hole 32 will be permanently covered by sleeve 34 because piston 26 can move no farther. By this time, however, the upper edge of sleeve 33 will have reached the hole 29 and when hole 29 is uncovered fluid pressure will begin to escape from beneath piston 24 with the result that spring 38 will move arm 37 and the piston 24 downward thereby decreasing the amount of fuel delivered to the engine by fuel pump 6 which will result in the speed of the engine being cut down. This will continue until a balance is reached wherein the amount of fuel admitted to the engine maintains it at the speed for which the governor 13 is set. It will thus be seen that upon increased engine speed the controller 11 is first moved to the highest speed position after which the amount of fuel admitted to the engine is decreased.

If now the engine begins to fall off in speed which may be due to increase in load, an action opposite to that just described takes place. The sleeves 33 and 34 will be moved upward by the governor 13 with the result that first the amount of fuel delivered to the engine is increased until a maximum is reached after which the controller will be operated to move it toward the first position thus changing the motor connections or weakening the generator field or both as the case may be, thereby unloading the engine.

It will thus be seen that the control of fuel to engine 5 and of the movements of controller 11 are entirely taken care of by governor 13 and that the governor effects such control one after the other. The arrangement is such that hole 29 coöperates always with the upper edge of sleeve 33 and hole 32 coöperates always with the lower edge of sleeve 34 and in no case do the sleeves 33 and 34 cover holes 29 and 32 at the same time. There is thus always an outlet for the pressure from pump 53 through either hole 29 or 32. Also spring 38 biases the piston 24 toward minimum fuel position and spring 43 biases piston 26 toward the first controller position. Therefore, in case the fluid pressure supply from pump 53 should fail springs 38 and 43 will immediately move piston 24 to minimum fuel position and piston 26 to first controller position respectively. This means that the structure errs on the side of safety.

If with the control handle 63 in the position shown in the drawing in full lines, i. e., high speed position, the speed of the car becomes too high, then the control handle is moved down one or more notches with the result that friction wheel 15 is moved toward the periphery of disk 16. This varies the speed relation between the engine and the governor and the governor speed immediately increases forcing sleeves 33 and 34 downward which affects the control mechanism in the manner already explained bringing the engine down to a speed corresponding to the new setting of the control handle 63. This, of course, decreases the generator speed and the power of the engine and hence the speed of the car.

With my improved arrangement, the governor 13 is set to operate at its most efficient and satisfactory speed for governing and this setting is not disturbed, the ratio between engine and governor speed being obtained by the change speed mechanism, here illustrated as comprising friction wheel 14 and disk 16. By this arrangement the governor is not required to operate over a wide range and will be equally sensitive for all engine speeds.

When the engine is being started the control handle 63 is in the dotted line position so that valves 74 and 67 are open and hence no pressure can be built up in cylinder 25. The controller 11 will, therefore, remain in first open circuit position and the speed governor will operate on the fuel supply only, idling the engine at the lowest practical speed to keep it in operation.

While I have illustrated and described the governor as being connected to effect the operation of both the fuel supply means and the controller, it will, of course, be understood that my invention is not necessarily limited to this double control and that if found desirable I may control only the fuel supply means from the governor and operate the controller means manually, or vice versa.

In accordance with the provisions of the patent statutes, I have described the principle of my invention together with the apparatus which I now consider to represent the best embodiment thereof, but I desire to have it understood that the apparatus shown is only illustrative and that the invention can be carried out by other means.

What I claim as new and desire to secure by Letters Patent of the United States, is:—

1. In a system of the character described, the combination of an engine, an electric generator driven thereby, means for regulating the supply of fuel to the engine, controller means for the generator, a speed governor, means connecting the speed governor to the regulating means and the controller means, a change speed driving means between the engine and the governor, and an operating handle for shifting said change speed driving means.

2. In a system of the character described, the combination of an engine, an electric generator driven thereby, means for regulating the supply of fuel to the engine, controller means for the generator, a speed governor, means connecting the speed governor to the regulating means and the controller means, a disk driven by the engine, a friction wheel connected to the governor and engaging said disk, and an operating handle for varying the distance between the center of the disk and said friction wheel.

3. In a system of the character described, the combination of an engine, an electric generator driven thereby, means for regulating the supply of fuel to the engine, controller means for the generator, a speed governor, means connecting the speed governor to the regulating means and the controller means, a change speed driving means between the engine and the governor, an operating handle for shifting said change speed driving means, and means rendering the connection between the speed governor and the controller means inoperative when the operating handle is moved to a position corresponding to a low engine speed.

4. In a system of the character described, the combination of an engine, an electric generator driven thereby, means for supplying fuel to the engine, a controller for the generator, means for operating the fuel supplying means and the controller comprising a pair of cylinders with pistons therein, means for supplying fluid pressure to said cylinders, means controlling said supply of fluid pressure whereby the fluid pressure operates said pistons successively, a speed governor connected to said last named means, and a change speed mechanism which connects said governor to the engine.

5. In a system of the character described, the combination of an engine, an electric generator driven thereby, means for supplying fuel to the engine, a controller for the generator, a cylinder, a piston in the cylinder operatively connected to said fuel supplying means, a second cylinder, a piston in the second cylinder operatively connected to the controller, means for supplying fluid under pressure to said cylinders, a stem associated with each cylinder and provided with a passage through which fluid pressure may escape, means controlling the escape of fluid pressure through such passages, a speed governor connected to said last named means, change speed mechanism connecting the governor to the engine, and a control handle for moving said change speed mechanism.

6. In a system of the character described, the combination of an engine, an electric generator driven thereby, means for supplying fuel to the engine, a controller for the generator, a cylinder, a piston in the cylinder operatively connected to said fuel supplying means, a second cylinder, a piston in the second cylinder operatively connected to the controller, means for supplying fluid under pressure to said cylinders, a stem associated with each cylinder and provided with a passage through which fluid pressure may escape, means controlling the escape of fluid pressure through such passages, a speed governor connected to said last named means, change speed mechanism connecting the governor to the engine, and a control handle for moving said change speed mechanism, the arrangement of the means which controls the escape of fluid pressure through said passages being such that the governor operates such means so that the fuel supplying means and the controller are operated successively.

7. In a system of the character described, the combination of an engine, an electric generator driven thereby, means for supplying fuel to the engine, a controller for the generator, a cylinder, a piston in the cylinder operatively connected to said fuel supplying means, a second cylinder, a piston in the second cylinder operatively connected to the controller, means biasing said pistons toward positions of minimum fuel supply and first controller position, means for supplying fluid under pressure to said cylinders to move the pistons, means forming a conduit through which fluid may escape from said cylinders, members which control the areas of said conduits, a speed governor connected to said members, and a change speed mechanism through which the governor is driven by the engine.

8. In a system of the character described, the combination of an engine, an electric generator driven thereby, means for supplying fuel to the engine, a controller for the generator, a cylinder, a piston in the cylinder operatively connected to said fuel supplying means, a second cylinder, a piston in the second cylinder operatively connected to the controller, means biasing said pistons toward positions of minimum fuel supply and first controller position, means for supplying fluid under pressure to said cylinders to move the pistons, means forming a conduit through which fluid may escape from said cylinders, members which control the areas of said conduits, a speed governor connected to said members, said governor actuating said members successively whereby variations in the fuel supply and the position of the controller take place successively, a change speed mechanism through which the governor is driven by the engine, and a control lever for adjusting the change speed mechanism.

9. In a system of the character described, the combination of an engine, an electric generator driven thereby, means for regulating the supply of fuel to the engine, controller means for the generator, a speed governor, means connecting said speed governor to the regulating means, a change speed driving means between the engine and the governor, and an operating handle for shifting said change speed driving means.

10. In a system of the character described, the combination of an engine, an electric generator driven thereby, means for regulating the supply of fuel to the engine, controller means for the generator, a speed governor, means connecting said speed governor to the controller means, a change speed driving means between the engine and the governor, and an operating handle for shifting said change speed driving means.

11. In a system of the character described, the combination of an engine, an electric generator driven thereby, means for regulating the supply of fuel to the engine, controller means for the generator, a speed governor, means connecting the speed governor to the regulating means, a disk driven by the engine, a friction wheel connected to the governor and engaging said disk, and an operating handle for varying the distance between the center of the disk and said friction wheel.

12. In a system of the character described, the combination of an engine, an electric generator driven thereby, means for regulating the supply of fuel to the engine, controller means for the generator, a speed governor, means connecting the speed governor to the controller means, a disk driven by the engine, a friction wheel connected to the governor and engaging said disk, and an operating handle for varying the distance between the center of the disk and said friction wheel.

In witness whereof, I have hereunto set my hand this 14th day of December 1918.

HERMANN LEMP.